(12) United States Patent
Wang

(10) Patent No.: US 6,340,069 B1
(45) Date of Patent: Jan. 22, 2002

(54) SOUND ELIMINATION STRUCTURE FOR AIR PUMP

(75) Inventor: Chiao-Ming Wang, Taichung Hsien (TW)

(73) Assignee: Meiko Pet Corporation, Taichung Hsien (TW)

(*) Notice: Subject to any disclaimer, the term of this patent is extended or adjusted under 35 U.S.C. 154(b) by 0 days.

(21) Appl. No.: 09/619,273

(22) Filed: Jul. 19, 2000

(51) Int. Cl.[7] .............................. F01N 1/08; F04B 39/12
(52) U.S. Cl. ...................... 181/272; 181/230; 417/312
(58) Field of Search ................................. 181/229, 231, 181/233, 264, 265, 269, 272, 273, 275, 276, 281, 282, 230; 417/312, 313

(56) References Cited

U.S. PATENT DOCUMENTS 5,137,432 A * 8/1992 Tsai ............................ 417/312
5,137,433 A * 8/1992 Willinger et al. ........... 417/312
5,711,656 A * 1/1998 Tsai ............................ 417/312

* cited by examiner

Primary Examiner—Khanh Dang
(74) Attorney, Agent, or Firm—Rosenberg, Klein & Lee

(57) ABSTRACT

The present invention relates to a sound elimination structure for an air pump, especially an air pump which is used in an aquarium. The sound elimination structure includes a sound elimination device including an air chamber box, and an air chamber cover secured with each other and defining a plurality of chambers therein. The air chamber cover and the air chamber box are provided with air guide tubes, recesses, air holes co-operating with catch plates so as to increase the path of the air flow, thereby reducing the velocity of the air flow so as to eliminate the noise.

3 Claims, 8 Drawing Sheets

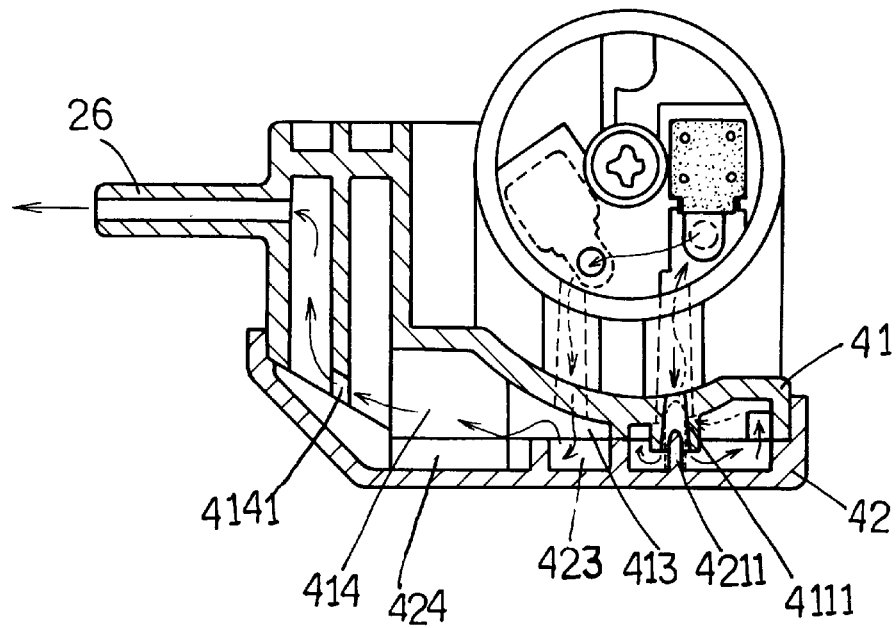
F I G. 8
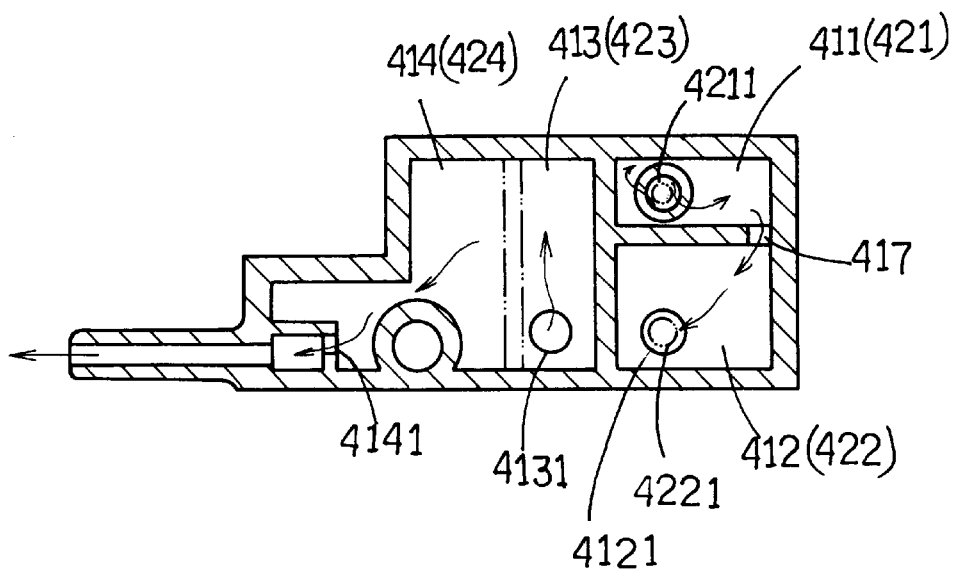
F I G. 9

SOUND ELIMINATION STRUCTURE FOR AIR PUMP

BACKGROUND OF THE INVENTION

1. Field of the Invention

The present invention relates to a sound elimination structure for an air pump which is especially used in an aquarium.

2. Description of the Related Art

A conventional air pump 10 for an aquarium in accordance with the prior art shown in FIG. 1 comprises a body 11 including an air inlet chamber 111 having an air inlet hole 113 forming a receiving recess 115, an air outlet chamber 112 having an air outlet hole 114 forming a receiving recess 115, an air suction hole 116 defined in the body 11, an air drain pipe 117 mounted on the body 11, a bottom cap 15 mounted on the body 11, a compression cup 12 mounted on the body 11, a vibration crank 13 mounted on the compression cup 12, a magnet 131 mounted on one end of the vibration crank 13, two anti-reverse structures 14 each received in the receiving recess 115 and each including an anti-reverse diaphragm 142 releasably encompassing the air inlet hole 113 and the air outlet hole 114, and a press block 141 pressing the anti-reverse diaphragm 142.

In operation, when the air pump 10 is energized, the magnet 131 is attracted or repelled by an electromagnetic device (not shown) to force the vibration crank 13 to vibrate so that the compression cup 12 can be pressed to move toward the body 11, and can be expanded to move opposite to the body 11. When the compression cup 12 is expanded to move opposite to the body 11, the environmental air is drawn into the air inlet chamber 111 through the air suction hole 116 and the air inlet hole 113. The anti-reverse diaphragm 142 is used to prevent the air from flowing back. When the compression cup 12 is pressed to move toward the body 11, the air is forced to flow through the air outlet hole 114 into the air outlet chamber 112, and is finally carried to the ambient environment through the air drain pipe 117. However, the travel path of the flowing air is very short, and the flowing air has a great velocity so that the flowing air easily create noise in the air pump 10.

SUMMARY OF THE INVENTION

In accordance with one aspect of the present invention, there is provided a sound elimination structure for an air pump comprising: a body, a compression cup, a vibration crank, and two anti-reverse structures, wherein, the body is separated into an air inlet chamber and an air outlet chamber and has a first side provided with a washer and a cover plate and a second side provided with a flange, the air inlet chamber is provided with an air input hole and an air inlet hole, the air outlet chamber is provided with an air output hole and an air outlet hole, the vibration crank has a first side secured on the compression cup which is mounted on the lug and a second side provided with a magnet co-operating with an external electromagnetic device, each of the air input hole and the air output hole defines a recess for receiving an anti-reverse structure, the improvement comprising:

the body provided with a sound elimination device which comprises an air chamber box, and an air chamber cover, wherein, the air chamber cover is provided on one side of the body, and is separated by a plurality of baffles into a first chamber, a second chamber, a third chamber, and a fourth chamber, an air inlet guide hole defined in the first chamber and connecting to an external air extraction hole, an air inlet chamber air inlet hole defined in the second chamber and connecting to the air inlet chamber of the body, an air outlet chamber air outlet hole defined in the third chamber and connecting to the air outlet chamber of the body, an air conveying hole defined in the fourth chamber and connecting to an air outlet tube of the body, a guide hole defined between the first chamber and the second chamber; and the air chamber box is separated by a plurality of baffles into an air inlet cabin, a first circuitous chamber, a second circuitous chamber, and an air guide chamber, each of the first circuitous chamber and second circuitous chamber provided with a catch plate which is fitted in the air inlet chamber air inlet hole and the air outlet chamber air outlet hole, and a guide hole defined between the second circuitous chamber and the air guide chamber.

In accordance with another aspect of the present invention, wherein, the air chamber cover is separated by a plurality of baffles into a first chamber, a second chamber, a third chamber, and a fourth chamber, the third chamber connecting to the fourth chamber, an air guide tube mounted in the first chamber and connecting to an external air extraction hole, an air inlet chamber air inlet hole defined in the second chamber and connecting to the air inlet chamber of the body, an air outlet chamber air outlet hole defined in the third chamber and connecting to the air outlet chamber of the body, an air conveying hole defined in the fourth chamber and connecting to an air outlet tube of the body, a guide hole defined between the first chamber and the second chamber; and the air chamber box is separated by a plurality of baffles into an air inlet cabin, a first circuitous chamber, a second circuitous chamber, and an air guide chamber, a first lug mounted in the air inlet cabin and loosely fitted in the air guide tube of the first chamber of the air chamber cover, and a second lug mounted in the first circuitous chamber and loosely fitted in the air inlet chamber air inlet hole of the second chamber of the air chamber cover.

Further benefits and advantages of the present invention will become apparent after a careful reading of the detailed description with appropriate reference to the accompanying drawings.

BRIEF DESCRIPTION OF THE DRAWINGS

FIG. 8 is a front plan cross-sectional view of the sound elimination structure as shown in FIG. 7;

FIG. 9 is a bottom plan cross-sectional view of the sound elimination structure as shown in FIG. 7;

DETAILED DESCRIPTION OF THE INVENTION

Figure 1:
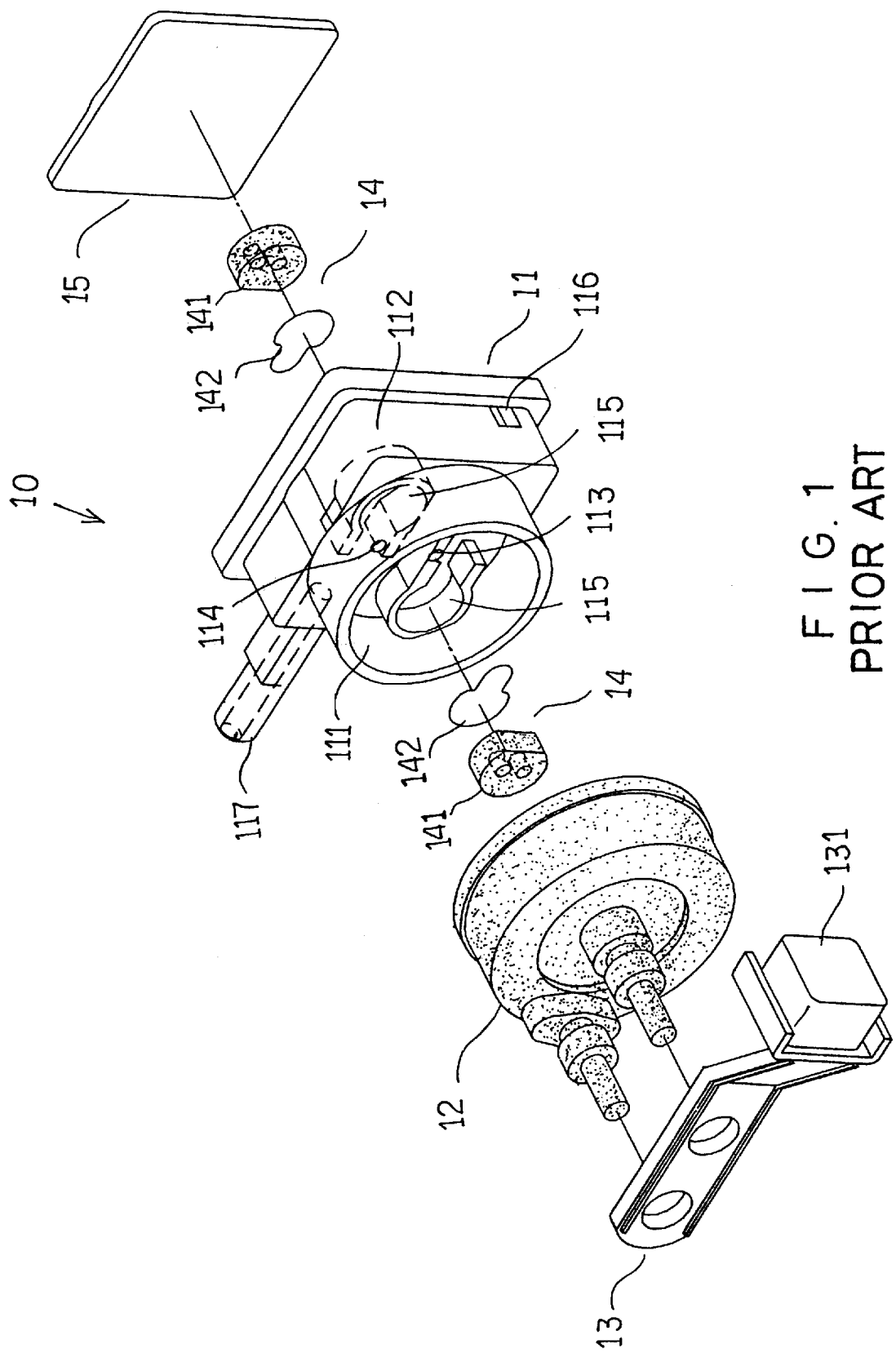
FIG. 1 is an exploded view of a conventional air pump in accordance with the prior art.
Figure 2:
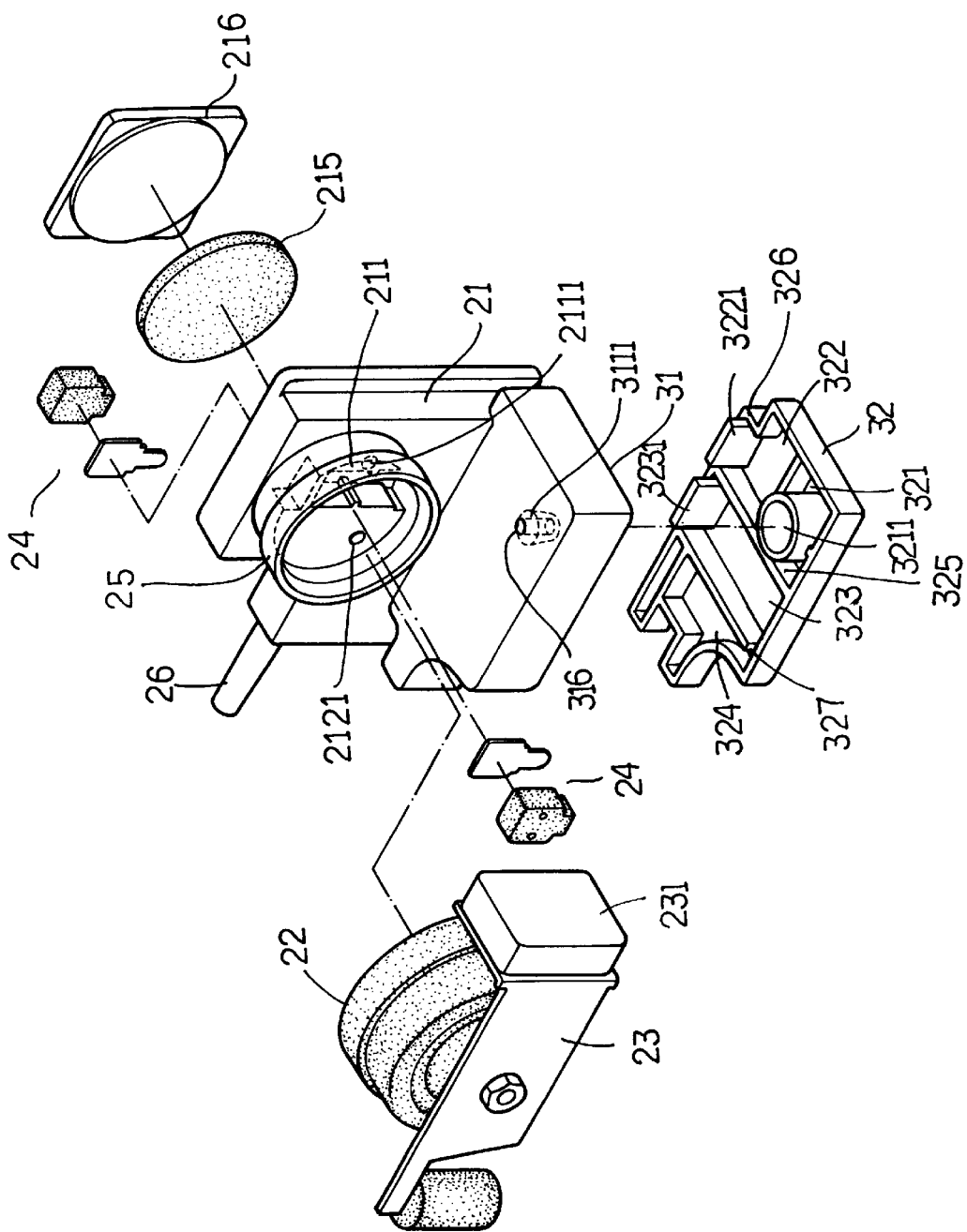
FIG. 2 is an exploded view of a sound elimination structure for an air pump in accordance with the present invention.
Figure 3:
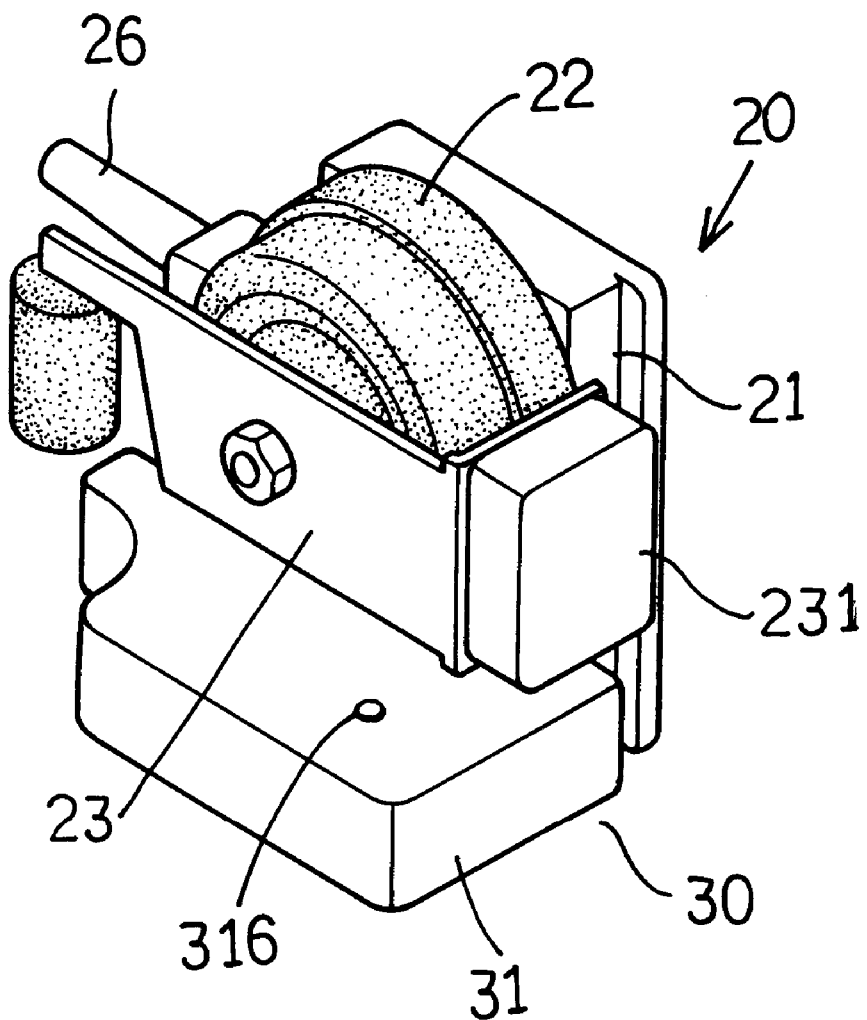
FIG. 3 is a perspective assembly view of the sound elimination structure as shown in FIG. 2.
Figure 4:
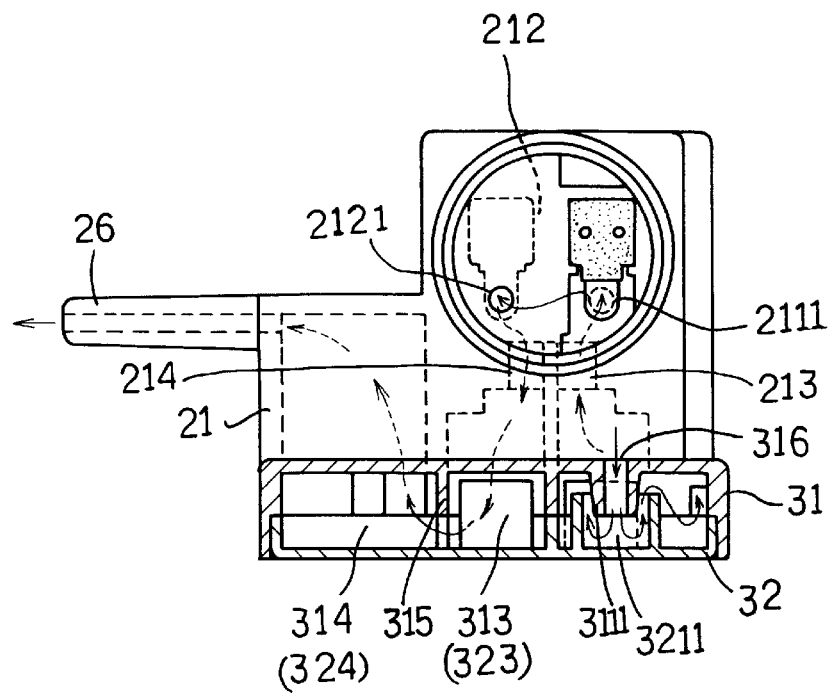
FIG. 4 is a front plan cross-sectional view of the sound elimination structure as shown in FIG. 3.
Figure 5:
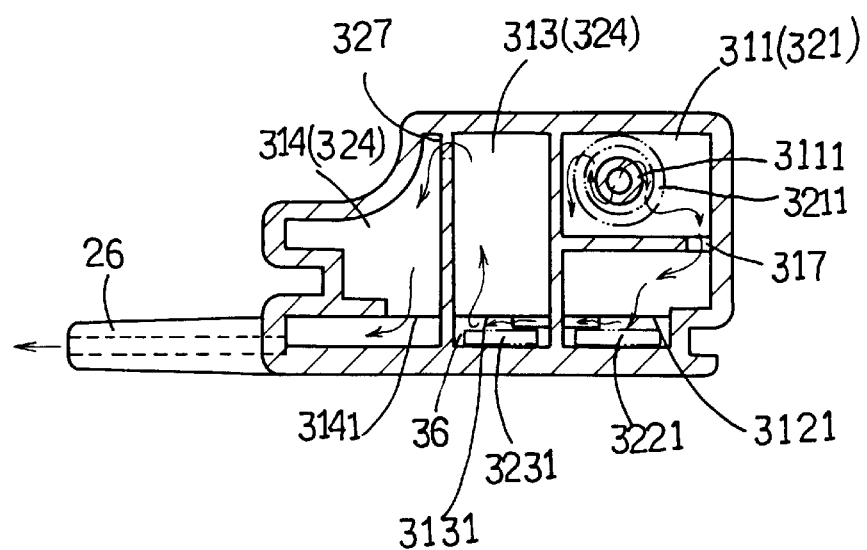
FIG. 5 is a bottom plan cross-sectional view of the sound elimination structure as shown in FIG. 3.
Figure 6:
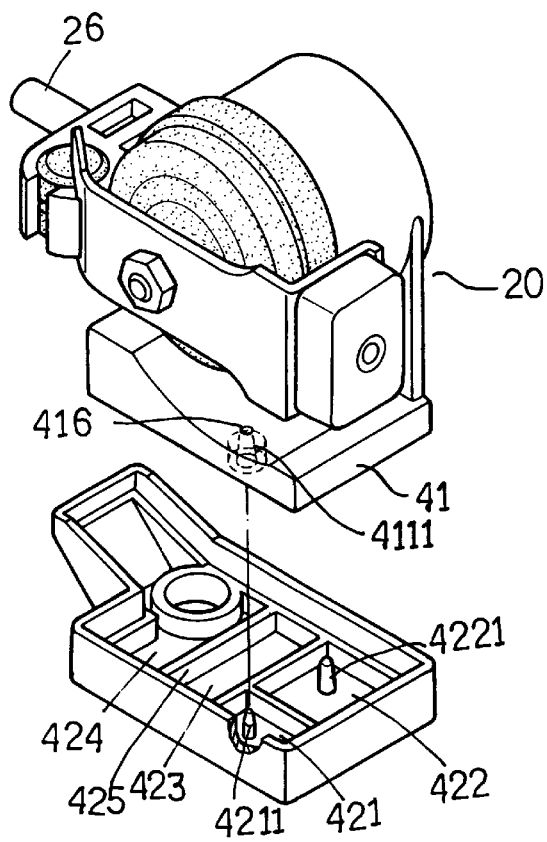
FIG. 6 is an exploded view of a sound elimination structure for an air pump in accordance with another embodiment of the present invention.
Figure 7:
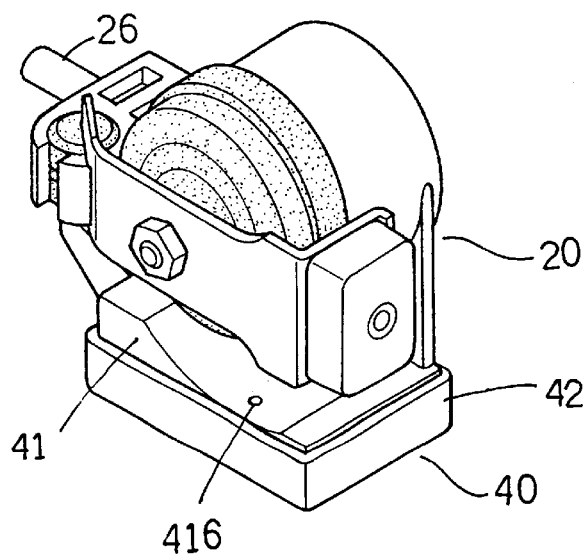
FIG. 7 is a perspective assembly view of the sound elimination structure as shown in FIG. 6.

Referring to the drawings and initially to FIGS. 2–5, a sound elimination structure in accordance with the present invention is used for an air pump 20 which comprises a body 21, a compression cup 22, a vibration crank 23, and two anti-reverse structures 24.

The body 21 is separated into an air inlet chamber 211 and an air outlet chamber 212 and has a first side provided with a washer 215 and a cover plate 216 and a second side provided with a flange 25. The air inlet chamber 211 is provided with an air input hole 2111 and an air inlet hole 213. The air outlet chamber 212 is provided with an air output hole 2121 and an air outlet hole 214. The vibration crank 23 has a first side secured on the compression cup 22 which is mounted on the lug 25 and a second side provided with a magnet 231 co-operating with an external electromagnetic device (not shown). Each of the air input hole 2111 and the air output hole 2121 defines a recess (not shown) for receiving an anti-reverse structure 24.

The body 21 is provided with a sound elimination device 30 which comprises an air chamber box 32, and an air chamber cover 31 secured with each other.

The air chamber cover 31 is provided on one side of the body 21, and is separated by a plurality of baffles 315 into a first chamber 311, a second chamber 312, a third chamber 313, and a fourth chamber 314. An air inlet guide hole 3111 is defined in the first chamber 311 and connects to an external air extraction hole 316. An air inlet chamber air inlet hole 3121 is defined in the second chamber 312 and connects to the air inlet chamber 211 of the body 21. An air outlet chamber air outlet hole 3131 is defined in the third chamber 313 and connects to the air outlet chamber 212 of the body 21. An air conveying hole 3141 is defined in the fourth chamber 314 and connects to an air outlet tube 26 of the body 21. A guide hole 317 is defined between the first chamber 311 and the second chamber 312.

The air chamber box 32 has an inner wall provided with a fitting groove 326 for fitting of the air chamber cover 31 so as to form a tight fitting state therebetween, thereby preventing the air from leaking. The air chamber box 32 can be separated by a plurality of baffles 325 into an air inlet cabin 321, a first circuitous chamber 322, a second circuitous chamber 323, and an air guide chamber 324 which are not in communication with each other and are respectively mated with each of the chambers of the air chamber cover 31. The air inlet cabin 321 defines a recess 3211 fitted with the air inlet guide hole 3111 of the air chamber cover 31. Each of the first circuitous chamber 322 and the second circuitous chamber 323 is provided with a catch plate 3221 and 3231 which is respectively fitted in the air inlet chamber air inlet hole 3121 and the air outlet chamber air outlet hole 3131. Each of the catch plates 3221 and 3231 has a dimension smaller than that of each of the air inlet chamber air inlet hole 3121 and the air outlet chamber air outlet hole 3131. A guide hole 327 is defined between the second circuitous chamber 323 and the air guide chamber 324.

In operation, when the air pump 20 is energized, the magnet 231 is attracted or repelled by means of an electromagnetic device (not shown), thereby forcing the vibrating crank 23 to vibrate so that the compressing cup 22 can be pressed to move toward the body 21, and can be expanded to move opposite to the body 21.

When the compression cup 22 is pulled outward, the environmental air is drawn through the air extraction hole 316 into the air inlet guide hole 3111 of the air chamber cover 21 of the sound elimination device 30.

When the air is introduced into the first chamber 311 (mating with the air inlet cabin 321), it is limited by the recess 3211 of the air chamber box 32 so as to form a compressed state so that the air is forced to pass through a gap 33 defined between the recess 3211 and the air inlet guide hole 3111 to flow into the first chamber 311 (mating with the air inlet cabin 321).

The air is then introduced into the second chamber 312 (mating with the first circuitous chamber 322) through the guide hole 317 between the first chamber 311 and the second chamber 312.

When the air is introduced into the air inlet chamber 211 of the body 21 from the air inlet chamber air inlet hole 3121 of the second chamber 312, the catch plate 3221 of the first circuitous chamber 322 of the air chamber box 32 will form an obstruction so that the air is forced to pass through the gap 34 defined between the catch plate 3221 and the air inlet chamber air inlet hole 3121 to be introduced into the air inlet chamber 211 of the body 21 through the air input hole 2111 to flow in the body 21.

The air then flows into the air outlet chamber 212, and is then introduced into the third chamber 313 (mating with the second circuitous chamber 323) through the air output hole 2121.

When the air is introduced into the third chamber 313, the catch plate 3231 of the second circuitous chamber 323 of the air chamber box 32 will form an obstruction so that the air is forced to pass through the gap 36 defined between the catch plate 3231 and the air outlet chamber air outlet hole 3131 to be introduced into the third chamber 313 (mating with the second circuitous chamber 323) whereby the air is compressed again so that the air will flow in the third chamber 313 (mating with the second circuitous chamber 323), and is then introduced into the fourth chamber 314 (mating with the air guide chamber 324 through the guide hole 327. The air is then drained outward from the air outlet tube 26 of the body 21 through the air conveying hole 3141.

Accordingly, the sound elimination structure of the invention can be used to increase the flow path of the air, and to reduce the flowing velocity of the air by provision of the recesses and the plurality of catch plates, thereby efficiently reducing or eliminating the noise of created by the air pump.

Referring now to FIGS. 6–9, in accordance with another embodiment of the present invention, the air chamber cover 41 is separated by a plurality of baffles 415 into a first chamber 411, a second chamber 412, a third chamber 413, and a fourth chamber 414, wherein the third chamber 413 connects to the fourth chamber 414. An air guide tube 4111 is mounted in the first chamber 411 and connects to an external air extraction hole 416. An air inlet chamber air inlet hole 4121 is defined in the second chamber 412 and connects to the air inlet chamber 211 of the body 21. An air outlet chamber air outlet hole 4131 is defined in the third chamber 413 and connects to the air outlet chamber 212 of the body 21. An air conveying hole 4141 is defined in the fourth chamber 414 and connects to an air outlet tube 26 of the body 21. A guide hole 417 is defined between the first chamber 411 and the second chamber 412.

The air chamber box 42 is separated by a plurality of baffles 425 into an air inlet cabin 421, a first circuitous chamber 422, a second circuitous chamber 423, and an air guide chamber 424. A first lug 4211 is mounted in the air inlet cabin 421 and is loosely fitted in the air guide tube 4111 of the first chamber 411 of the air chamber cover 41. A second lug 4221 is mounted in the first circuitous chamber 422 and is loosely fitted in the air inlet chamber air inlet hole 4121 of the second chamber 412 of the air chamber cover 41.

Accordingly, the sound elimination structure of the invention can be used to reduce the flowing velocity of the air by provision of the lugs 4211 and 4221, thereby efficiently reducing or eliminating the noise of created by the air pump.

Figure 10:
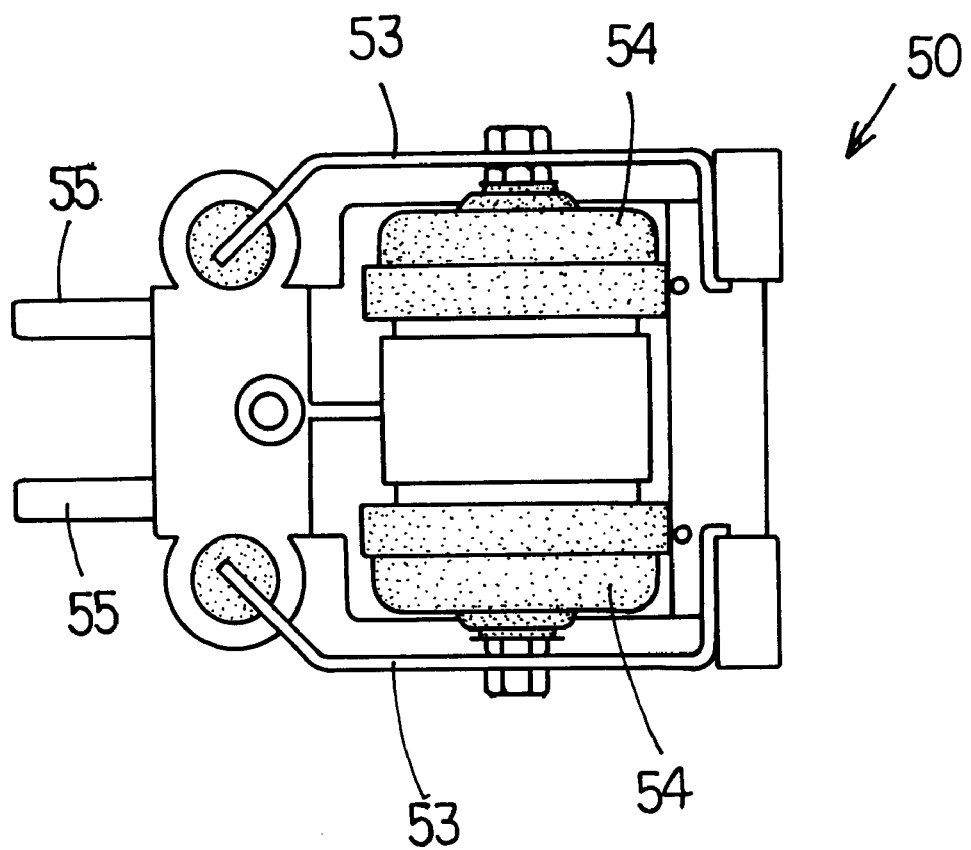
FIG. 10 is a top plan view of a sound elimination structure for an air pump in accordance with a further embodiment of the present invention.
Figure 11:
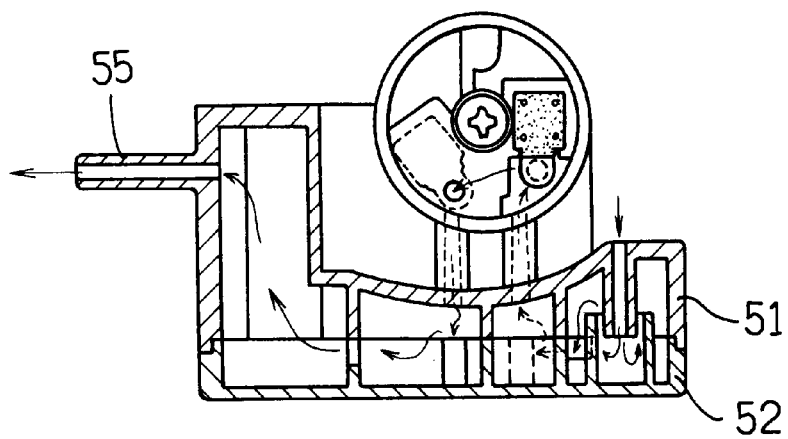
FIG. 11 is a front plan cross-sectional view of the sound elimination structure as shown in FIG. 10.
Figure 12:
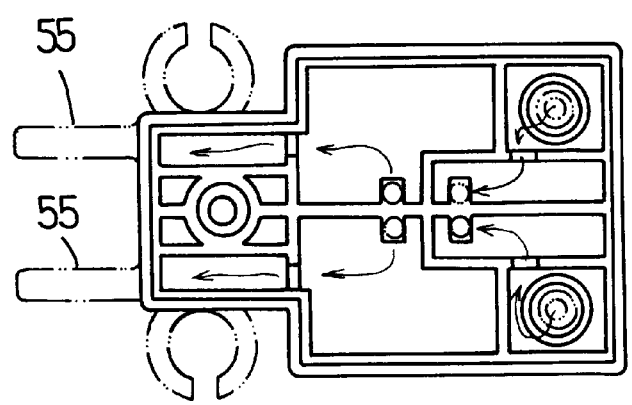
FIG. 12 is a bottom plan view of the sound elimination structure as shown in FIG.10.

Referring to FIGS. 10–12, in accordance with a further embodiment of the present invention, the air chamber box 51 and the air chamber cover 52 are provided two sets of air flow paths to co-operate with two sets of vibration cranks 53 and two sets of compression cups 54 so as to form two sets of corresponding air pumps 50.

It should be clear to those skilled in the art that further embodiments may be made without departing from the scope of the present invention.

What is claimed is:

1. A sound elimination structure for an air pump comprising: a body (21), a compression cup (22), a vibration crank (23), and two anti-reverse structures (24), wherein, said body (21) is separated into an air inlet chamber (211) and an air outlet chamber (212) and has a first side provided with a washer (215) and a cover plate (216) and a second side provided with a lug (25), said air inlet chamber (211) is provided with an air input hole (2111) and an air inlet hole (213), said air outlet chamber (212) is provided with an air output hole (2121) and an air outlet hole (214), said vibration crank (23) has a first side secured on said compression cup (22) which is mounted on said lug (25) and a second side provided with a magnet (231) co-operating with an external electromagnetic device, each of said air input hole (2111) and said air output hole (2121) defines a recess for receiving an anti-reverse structure (24), the improvement comprising:

said body (21) provided with a sound elimination device which comprises an air chamber box, and an air chamber cover, wherein, said air chamber cover is provided on one side of said body (21), and is separated by a plurality of baffles into a first chamber, a second chamber, a third chamber, and a fourth chamber, an air inlet guide hole defined in said first chamber and connecting to an external air extraction hole, an air inlet chamber air inlet hole defined in said second chamber and connecting to said air inlet chamber of said body, an air outlet chamber air outlet hole defined in said third chamber and connecting to said air outlet chamber of said body, an air conveying hole defined in said fourth chamber and connecting to an air outlet tube of said body, a guide hole defined between said first chamber and said second chamber; and said air chamber box is separated by a plurality of baffles into an air inlet cabin, a first circuitous chamber, a second circuitous chamber, and an air guide chamber, each of said first circuitous chamber and second circuitous chamber provided with a catch plate which is fitted in said air inlet chamber air inlet hole and said air outlet chamber air outlet hole, and a guide hole defined between said second circuitous chamber and said air guide chamber.

2. The sound elimination structure in accordance with claim 1, wherein, said air chamber cover is separated by a plurality of baffles into a first chamber, a second chamber, a third chamber, and a fourth chamber, said third chamber connecting to said fourth chamber, an air guide tube mounted in said first chamber and connecting to an external air extraction hole, an air inlet chamber air inlet hole defined in said second chamber and connecting to said air inlet chamber of said body, an air outlet chamber air outlet hole defined in said third chamber and connecting to said air outlet chamber of said body, an air conveying hole defined in said fourth chamber and connecting to an air outlet tube of said body, a guide hole defined between said first chamber and said second chamber; and said air chamber box is separated by a plurality of baffles into an air inlet cabin, a first circuitous chamber, a second circuitous chamber, and an air guide chamber, a first lug mounted in said air inlet cabin and loosely fitted in said air guide tube of said first chamber of said air chamber cover, and a second lug mounted in said first circuitous chamber and loosely fitted in said air inlet chamber air inlet hole of said second chamber of said air chamber cover.

3. The sound elimination structure in accordance with claim 1 or 2, wherein said air chamber box and said air chamber cover are provided two sets of air flow paths to co-operate with two sets of vibration cranks and two sets of compression cups so as to form two sets of corresponding air pumps.

* * * * *